(12) United States Patent
Gayfer et al.

(10) Patent No.: US 8,522,823 B2
(45) Date of Patent: Sep. 3, 2013

(54) ONE-WAY CHECK VALVE

(75) Inventors: Robert Gayfer, Greenville, SC (US); Mark Michel, Greer, SC (US); Thomas S. Head, Greenville, SC (US)

(73) Assignee: Ellcon National, Inc., Greenville, SC (US)

(*) Notice: Subject to any disclaimer, the term of this patent is extended or adjusted under 35 U.S.C. 154(b) by 343 days.

(21) Appl. No.: 12/846,575

(22) Filed: Jul. 29, 2010

(65) Prior Publication Data

US 2012/0024402 A1     Feb. 2, 2012

(51) Int. Cl.
*F16K 15/14*     (2006.01)

(52) U.S. Cl.
USPC .............................. 137/846; 137/843; 303/81

(58) Field of Classification Search
USPC ........................... 137/853, 852, 860; 303/81
See application file for complete search history.

(56) References Cited

U.S. PATENT DOCUMENTS

| | | | | |
|---|---|---|---|---|
| 2,176,565 A * | 10/1939 | Boynton | ....................... | 137/223 |
| 4,357,959 A | 11/1982 | Shetler | | |
| 5,261,459 A * | 11/1993 | Atkinson et al. | .............. | 137/846 |
| 6,709,070 B1 * | 3/2004 | Wright et al. | .................. | 303/81 |
| 7,748,385 B2 * | 7/2010 | Lieberman et al. | ...... | 128/207.12 |

FOREIGN PATENT DOCUMENTS

| | | |
|---|---|---|
| GB | 2359609 | 8/2001 |
| WO | 86/03254 | 6/1986 |
| WO | 2004/023010 | 3/2004 |

OTHER PUBLICATIONS

Patent Examination Report No. 1 dated Jul. 26, 2012 for co-pending Australian Patent Application No. 2011205096.

* cited by examiner

*Primary Examiner* — John Rivell
*Assistant Examiner* — Mer Arnel Mahahan
(74) *Attorney, Agent, or Firm* — Nelson Mullins Riley & Scarborough, LLP

(57) ABSTRACT

A railway car control valve comprises a brake pipe port, an auxiliary reservoir port, a main piston configured to compare air pressures at the brake pipe port and the auxiliary reservoir port, and a one-way check valve positioned intermediate the brake pipe port and the auxiliary reservoir port. The one way check valve comprises a body having a bore extending from its first end to its second end, an elongated insert configured to reduce the rate of air flow through the body, and a sleeve received on the insert's outer surface. The insert is received in the body bore. One of the insert and the sleeve is configured to move between a first position and a second position that either allows air to flow or prevents air from flowing, respectively.

16 Claims, 5 Drawing Sheets

ONE-WAY CHECK VALVE

FIELD OF THE INVENTION

The present invention relates generally to railcar brake systems. More particularly, the present invention relates to a one-way check valve for use in a service portion of a pneumatic control valve in a railway car brake system.

BACKGROUND

Railway car brake systems generally include a pneumatic brake control valve responsive to relative changes in brake pipe pressure. When brake pipe pressure drops below a predetermined value, the brakes are applied. Alternatively, when the brake pipe pressure increases over the predetermined value, the brakes are released. Prior art brake control valves generally include a service portion and an emergency portion. Each section includes a separate piston responsive to brake pipe pressure on one side and a reference pressure on the other side.

Control valves are designed to be insensitive to pneumatic noise signals in the brake pipe that would cause undesired emergency braking and undesired brake release. Various mechanisms have been used, for example, chokes or restrictions, for placing the brake pipe and the reference chambers in fluid communication to compensate for the pneumatic noise. In one instance, a small stability choke provides fluid communication between the auxiliary reservoir and the brake pipe. Prior art stability chokes are bidirectional and thereby require additional structure to only allow airflow in one direction. The additional structure complicates the manufacture and operation of the brake control valve, and provides unintended consequences.

SUMMARY OF THE INVENTION

The present invention recognizes and addresses disadvantages of prior art constructions and methods, and it is an object of the present invention to provide an improved control valve. This and other objects may be achieved by a one-way check valve body having a first end, a second end, and a bore extending from the first end to the second end, and an insert having a first end, a second end, a middle portion therebetween, and an axis extending from the first end to the second end. A sleeve is operatively received on the insert intermediate the first end and the second end. The insert is positioned in the body bore. Wherein when one of the insert and the sleeve is in a first position, air flows in the body second end and out the body first end, and when the insert or the sleeve is in a second position, air is prevented from flowing through the body in either direction.

In some embodiments, the insert further comprises an axial blind bore extending from the second end and a radial bore intersecting the axial blind bore. In these embodiments, a diameter of the radial bore defines the rate of air flow through the check valve. In other embodiments, the insert is formed from a metal. In yet other embodiments, the insert is formed from a polymer material. In yet other embodiments, a first filter is positioned intermediate the body first end and the insert first end, and a second filter intermediate the body second end and the insert second end.

In some embodiments, a gasket is received on the body second end. In yet other embodiments, the sleeve is formed from a polymer material. In still other embodiments, the sleeve is formed from an elastomer material.

In other embodiments, a porosity of the material forming a portion of the insert middle portion and a portion of the insert second end are chosen to allow air to flow through the insert second end portion and out the insert middle portion.

In another preferred embodiment, a one-way check valve comprises a body having a first end, a second end, a bore extending from the first end to the second end, and an elongated insert defining an outer surface, the insert configured to reduce the rate of air flow through the body. A sleeve is received on the insert outer surface, and the insert is received in the body bore. One of the sleeve and the insert allows air to flow in a first direction from the body second end to the body first end and prevents air flow in an opposite second direction.

In some embodiments, when the air pressure at the body second end is greater than a predetermined air pressure, one of the sleeve and the insert increases in diameter to allow air to flow in the first direction. In yet other embodiments, the insert further comprises an axial blind bore extending from an end of the insert proximate the body second end, and a radial bore intersecting the axial blind bore and opening to the insert outer surface. In these embodiments, the diameter of the radial bore determines the flow rate through the valve.

In some embodiments, the sleeve is formed from one of an elastomer and polymer material. In yet other embodiments, the insert defines a first end located proximate the body first end, a second end proximate the body second end and a middle portion therebetween, wherein a portion of the insert second end and a portion of the middle portion has a porosity that is chosen to allow air to flow through the insert between the second end and the middle portion at a predetermined flow rate.

In another preferred embodiment, a railway car control valve comprises a brake pipe port, an auxiliary reservoir port, a main piston intermediate the brake pipe port and the auxiliary reservoir port, the main piston configured to compare an air pressure supplied at the brake pipe port with an air pressure supplied at the auxiliary reservoir port and a one-way check valve positioned intermediate the brake pipe port and the auxiliary reservoir port. The one-way check valve comprises a body having a first end, a second end, and a bore extending from the first end to the second end, an elongated insert defining an outer surface, the insert configured to reduce the rate of air flow through the body, and a sleeve received on the insert outer surface. The insert is received in the body bore. One of the sleeve and the insert is configured to move between a first position that allows air to flow in a first direction from the brake pipe port to the auxiliary reservoir, and a second position that prevents air from flowing in a second direction from the auxiliary reservoir port to the brake pipe port.

In some embodiments, when the air pressure at the brake pipe port is greater than a predetermined air pressure, the sleeve increases in diameter from the second position to the first position to allow air to flow from the brake pipe port to the auxiliary reservoir port.

In other embodiments, the insert further comprises an axial blind bore extending from an end of the insert proximate the body second end, and a radial bore intersecting the axial blind bore and opening to the insert outer surface. In these embodiments, the diameter of the radial bore determines the flow rate through the check valve. In yet other embodiments, the insert defines a first end located proximate the body first end, a second end proximate the body second end and a middle portion therebetween, wherein a portion of the insert second end and a portion of the middle portion have a porosity that allows air to flow through the insert between the second end and the middle portion at a predetermined flow rate.

Various combinations and sub-combinations of the disclosed elements, as well as methods of utilizing same, which are discussed in detail below, provide other objects, features and aspects of the present invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
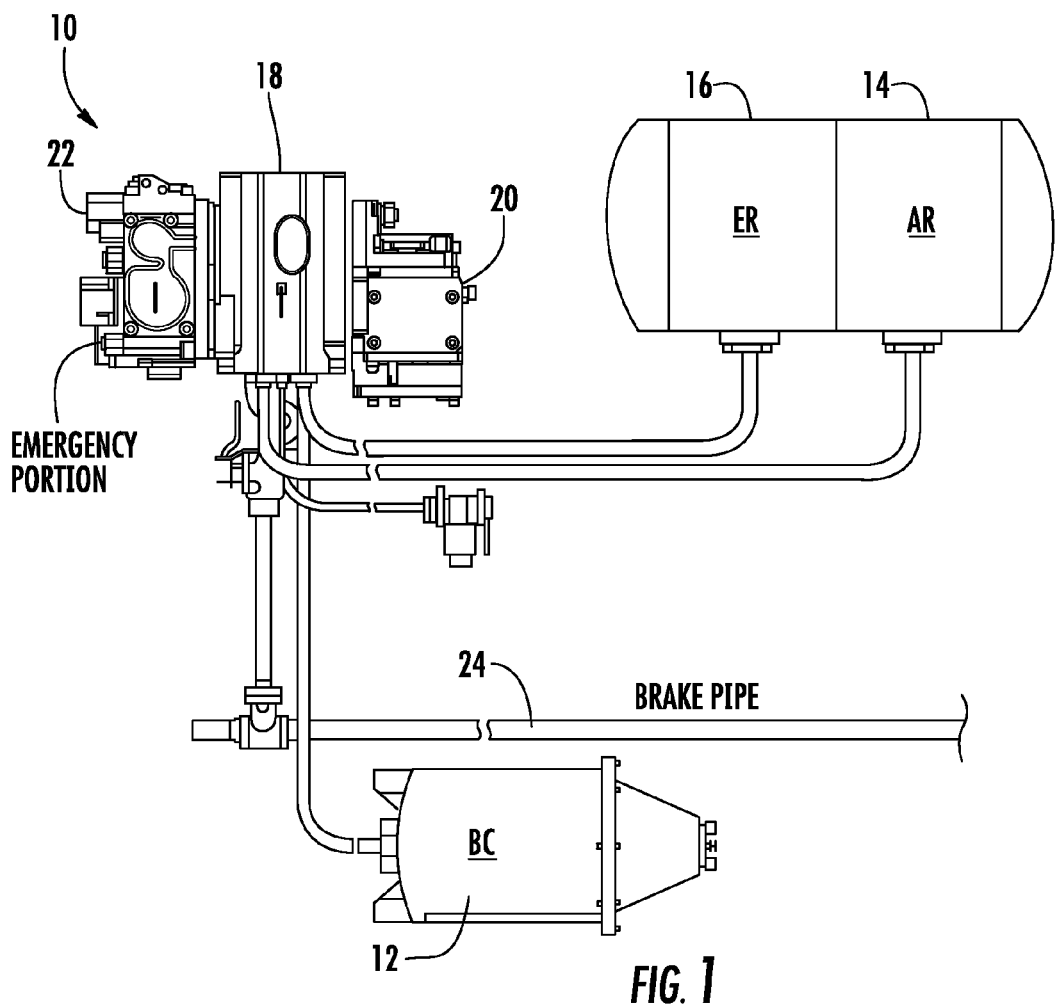
FIG. 1 is a schematic view of a railway car brake system using an embodiment of a one-way valve of the present invention.

Repeat use of reference characters in the present specification and drawings is intended to represent same or analogous features or elements of the invention according to the disclosure.

DETAILED DESCRIPTION OF THE PREFERRED EMBODIMENT

Reference will now be made in detail to presently preferred embodiments of the invention, one or more examples of which are illustrated in the accompanying drawings. Each example is provided by way of explanation, not limitation, of the invention. It is to be understood by one of ordinary skill in the art that the present discussion is a description of exemplary embodiments only, and is not intended as limiting the broader aspects of the present invention, which broader aspects are embodied in the exemplary constructions. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a pneumatic railway car control valve system 10 comprises a pipe bracket 18, an emergency portion 22 and a service portion 20. Emergency portion 22 and service portion 20 bolt onto pipe bracket 18, which is used to connect to a railcar brake system and provide a standard connection to all prior art railcar brake systems. Pipe bracket 18 couples to a brake pipe 24, a brake cylinder 12, an emergency reservoir 16 and an auxiliary reservoir 14.

Control Valve Service Portion 20
(a) supplies compressed air to emergency and auxiliary reservoirs 16 and 14, respectively during an initial charging of the brake system, or during a recharging of the brake system following a brake release;
(b) connects auxiliary reservoir 14 to brake cylinder 12 when a reduction of air pressure in brake pipe 24 reaches a predetermined level; and
(c) releases pressure in brake cylinder 12 when a brake release is commanded.

Control Valve Emergency Portion 22
(a) helps to fill the brake air system during a brake release following an emergency braking;
(b) assists in brake pipe pressure reduction during a service braking by discharging a predetermined amount of brake pipe pressure to atmosphere; and
(c) quickly exhausts brake pipe pressure to atmosphere during emergency braking.

For purposes of clarity, only the structure and operation of service portion 20 will be discussed herein since the one-way valve of the present invention may be used in the service portion.

Figure 2:
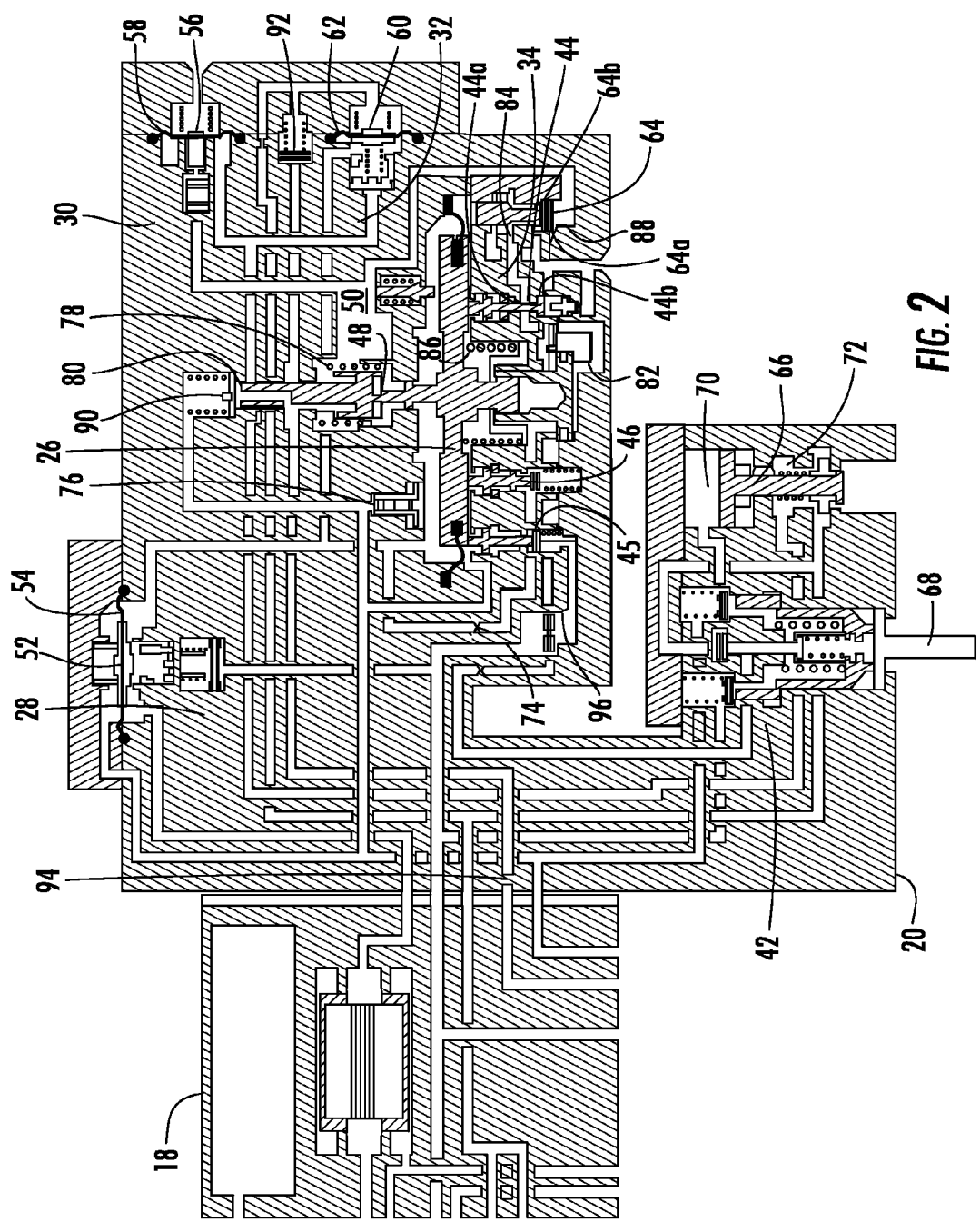
FIG. 2 is a schematic view of a control valve for use in the brake system of FIG. 1, including the one-way valve of the present invention.

Referring to FIG. 2, service portion 20 comprises a service brake main piston 26, a service brake accelerated release valve, generally denoted at 28, a quick service brake limiting valve, generally denoted at 30, an auxiliary reservoir pressure release valve, generally denoted at 32, a quick service brake valve, generally denoted at 34 and a manual release valve, generally denoted at 42. Service brake main piston 26 compares brake pipe pressure with auxiliary reservoir pressure. That is, brake pipe pressure exerts a force against a top surface of service piston 26, and auxiliary reservoir pressure exerts a force against a bottom surface of service piston 26. The lower surface of brake piston 26 is in direct contact with a lap valve seat 64a and a feeder valve seat 64b that allow auxiliary and emergency reservoirs 14 and 16 to fill from air pressure from brake pipe 26. A lap spring biases the lap valve into a closed position. Service brake main piston 26 also operates a quick service brake valve 48, which allows airflow from the brake pipe to flow into a quick service chamber 50.

Service brake accelerated release valve 28 is formed from a metal insert 52 and a textile/rubber membrane 54, and functions to compare brake pipe pressure to that of the auxiliary reserve pressure. When this valve is open, air of emergency reservoir 16 is allowed to flow into brake pipe 24 so as to increase the brake pipe pressure downstream to accelerate the release signal to railcars further downstream. Quick service brake limiting valve 30 is formed from a metal insert 56 and a textile/rubber membrane 58, and is pressurized by air from brake cylinder 12. This valve functions to allow a controlled air flow from brake pipe 24 to brake cylinder 12, and is limited to a predetermined pressure.

Auxiliary reservoir pressure release valve 32 is formed from a metal insert 60 and a textile/rubber membrane 62. One side of the auxiliary reservoir pressure release valve 32 is pressurized by brake pipe air and the other is in fluid communication with brake cylinder 12. Following an emergency braking, and after a manual release, the rising brake pipe pressure during recharging operates the valve so that auxiliary air pressure is transmitted into brake pipe 24. By allowing auxiliary air pressure to enter into brake pipe 24, the overall pressure of the brake pipe is raised faster than if only charged by the air source in the locomotive.

Quick service brake valve 34 has a piston that is pressurized on one side by auxiliary reservoir pressure, and controls the flow of brake pipe air flow to atmosphere when the auxiliary air pressure drops during a braking command. As soon as main service piston 26 begins to re-pressurize auxiliary reservoir 14, the main piston moves upward and releases lap valve 44 thereby stopping brake pipe 24 from exhausting to atmosphere.

A piston 66 of release valve 42 is pressurized on both sides by air pressure from brake cylinder 12, and functions to close the brake cylinder from atmosphere. When a release handle 68 is manually activated, an upper part 70 of piston 66 is opened to atmosphere. Piston 66 remains in an open position until the pressure of brake cylinder 12, acting on a lower side 72, drops through main service piston 26.

During a service braking application, a drop in pressure occurs in brake pipe 24, and once the pressure drops below a predetermined threshold, a quick service phase is initiated. Choke 74 and one-way check valve 76 prevent the auxiliary reservoir from dropping in pressure as fast as the brake pipe pressure, thereby causing main service piston 26 to move upward allowing valves 45 and 46 to close. The one-way check valve allows airflow from the brake pipe to the auxiliary reservoir, but prevents airflow from the auxiliary reservoir to the brake pipe, which prevents an accidental reapplication of the brake due to a pressure differential between the brake pipe and the auxiliary reservoir. That is, one-way check valve 76 prevents unintended brake application and release due to small changes in the relative pressures of the brake pipe and auxiliary reservoir.

Referring to FIGS. 3 through 5B, three embodiments of one-way check valve 76 are illustrated for use in the service portion of the pneumatic brake control valve discussed above. One-way check valve 76 generally comprises a valve body 102 having a first end 106 and a second end 108. First end 106 defines a first bore 106a, and second end 108 defines a second bore 108a that is in fluid communication with first bore 106a. An intermediate opening 124 couples the first bore 106a to the second bore 108a, where a diameter of intermediate opening 124 is smaller than the diameter of the first and second bores. Second end 108 defines an annular flange 108b configured to receive and retain an annular gasket 104 thereon. Gasket 104 defines an opening 104b therein that is larger in diameter than the second end bore.

Figure 3:
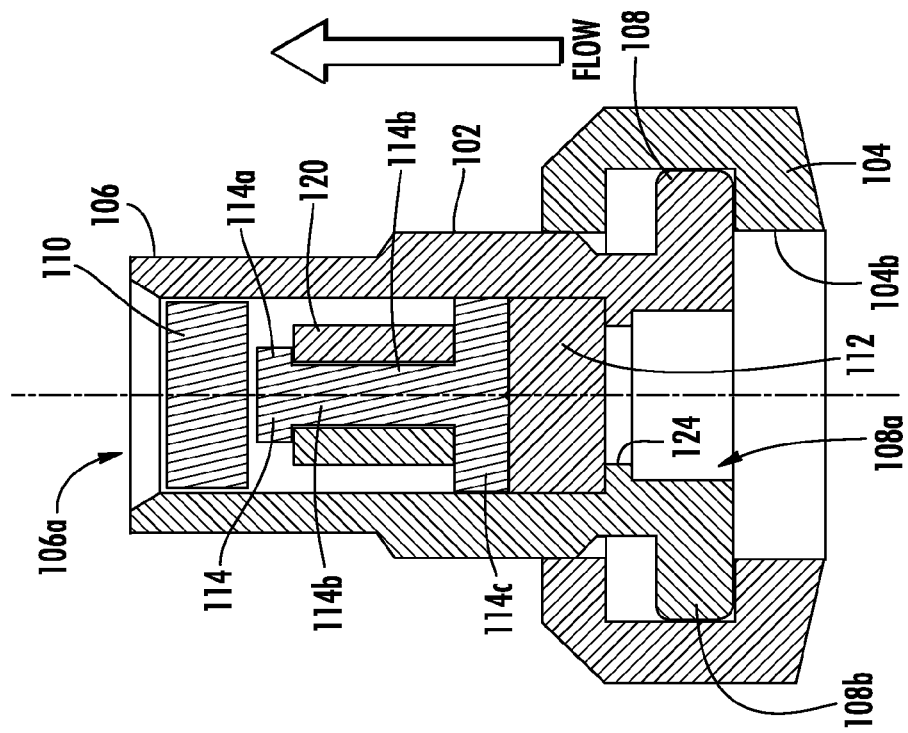
FIG. 3 is a sectional view of an embodiment of a one-way valve for use in the brake system of FIG. 1 and the control valve of FIG. 2.

In a first embodiment, as shown in FIG. 3, metal insert 114, located in first bore 112 intermediate opening 124 and the opening of first bore 106a, defines a first end 114a, an opposite second end 114c and a middle portion 114b therebetween. A first filter 110 is located in first bore 106a proximate to metal insert first end 114a, and a second filter 112 is located in first bore 106a intermediate metal insert second end 114c and opening 124. An axial bore 116 is formed in metal insert second end 114c, which defines an opening 122 proximate second filter 112. In one embodiment, axial bore 116 is between about 0.03 and 0.06 inches diameter, and in a most preferred embodiment axial bore 116 is approximately 0.045 inches.

A radial bore 118 is formed through metal insert middle portion 114b, intersects axial bore 116 and opens at opposite sides of the metal insert middle portion. A diameter of radial bore 118 is chosen so as to affect the air flow rate through the bore. In one embodiment, the diameter of radial bore 118 is between about 0.005 and 0.01 inches, and in one preferred embodiment the diameter of radial bore 118 is 0.007 inches. A sleeve 120 is received about metal insert middle portion 114b intermediate metal insert first and second ends 114a and 114b, and is sized and shaped to be received about metal insert middle portion 114b in a position that at least surrounds the openings of radial bore 118. Sleeve 120 may be formed from a suitable polymer or elastomer. In an embodiment, sleeve 120 is formed from either Nitrile rubber or Silicone rubber with a durometer of 70+/−5 Shore A hardness, and is between about 0.1 and 0.2 inches long.

Figure 4:
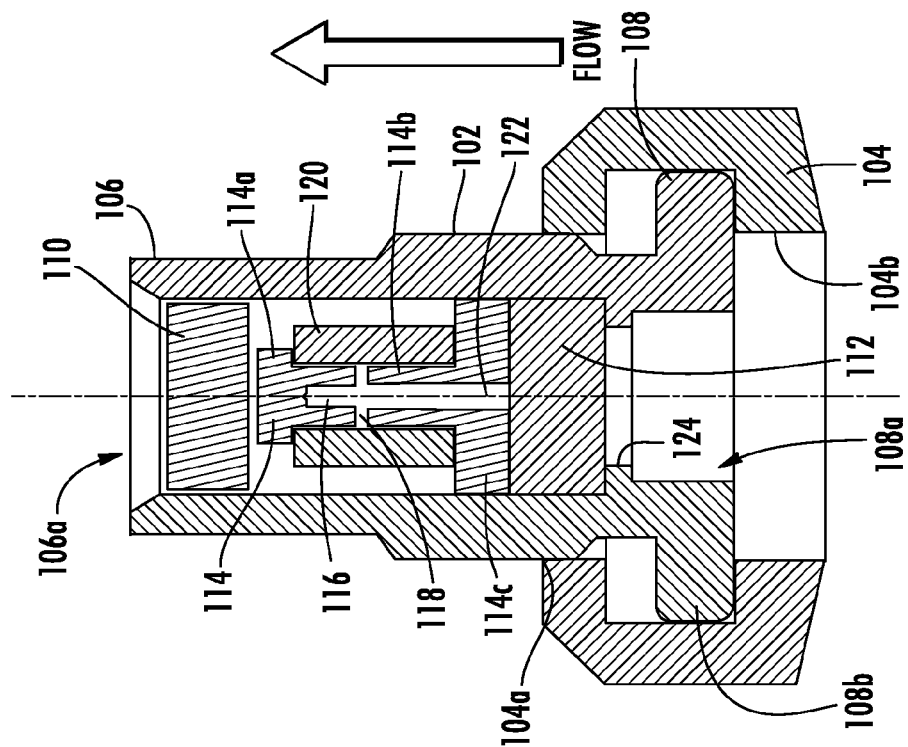
FIG. 4 is a sectional view of an embodiment of a one-way valve for use in the brake system of FIG. 1 and the control valve of FIG. 2.

In a second embodiment, as shown in FIG. 4, a metal insert 114 is located in first bore 112 and defines a first end 114a, an opposite second end 114c and a middle portion 114b therebetween. A first filter 110 is located in first bore 106a proximate to metal insert first end 114a, and a second filter 112 is located in first bore 106a intermediate metal insert second end 114c and intermediate opening 124. Middle portion 114b and a part of second end 114c are formed from a porous metal that allows air to flow therethrough. The porosity of the material determines the rate of flow of air through the material. In one embodiment, insert 114 is formed from FX 2008-50 Sintered steel, and has a density of 0.21 to 0.25 pounds per cubic inch. In one preferred embodiment, the airflow rate through insert end 114c allows for a 9 psi increase in a 34 cubic inch volume over a one and one-half minute time period from a 70 psi pressure source at insert first end 114a.

A sleeve 120 is received about metal insert middle portion 114b intermediate metal insert first and second ends 114a and 114b, and is sized and shaped to be received about metal insert middle portion 114b in a position that at least surrounds the openings of radial bore 118. Sleeve 120 may be formed from a suitable polymer or elastomer. In an embodiment, sleeve 120 is formed from either Nitrile rubber or Silicone rubber with a durometer of 70+/−5 Shore A hardness, and is between about 0.1 and 0.2 inches long. Sleeve 120 is designed to provide a cracking pressure of 1 psi.

Figure 5A:
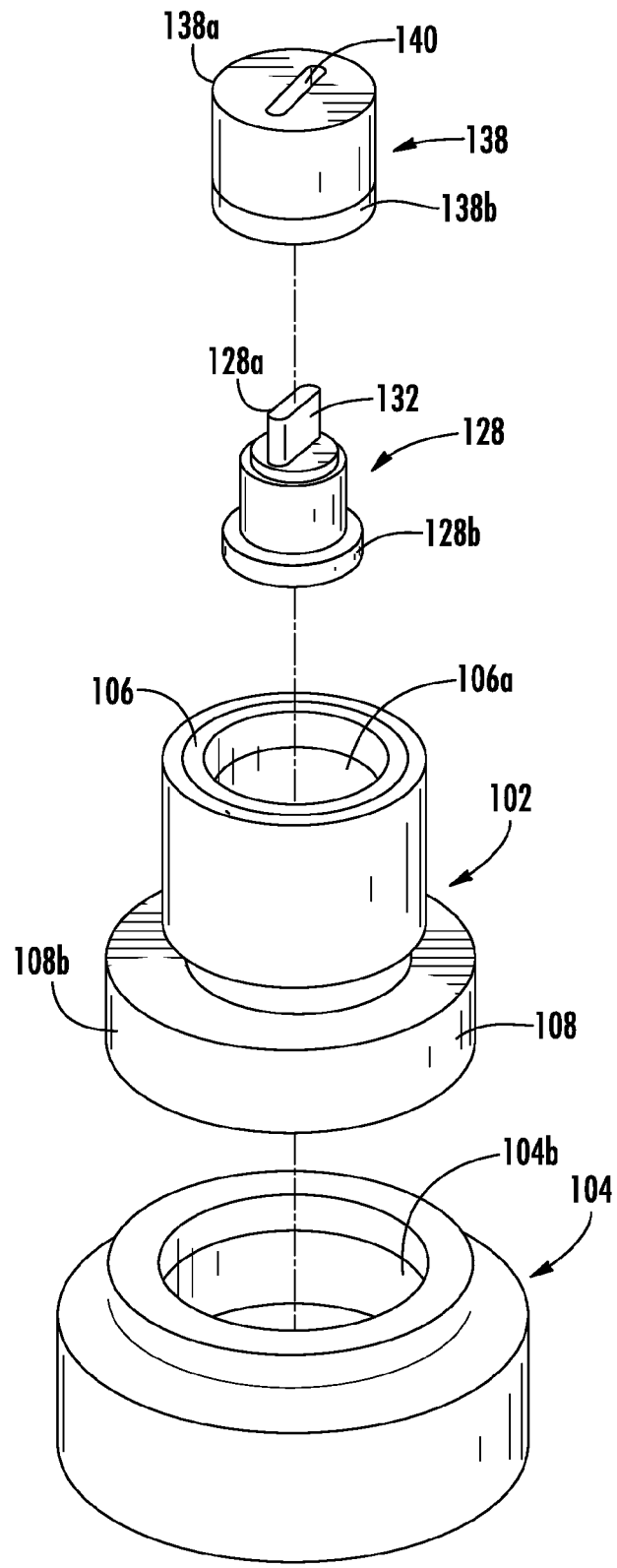
FIG. 5A is an exploded view of an embodiment of a one-way valve for use in the brake system of FIG. 1 and the control valve of FIG. 2.
Figure 5B:
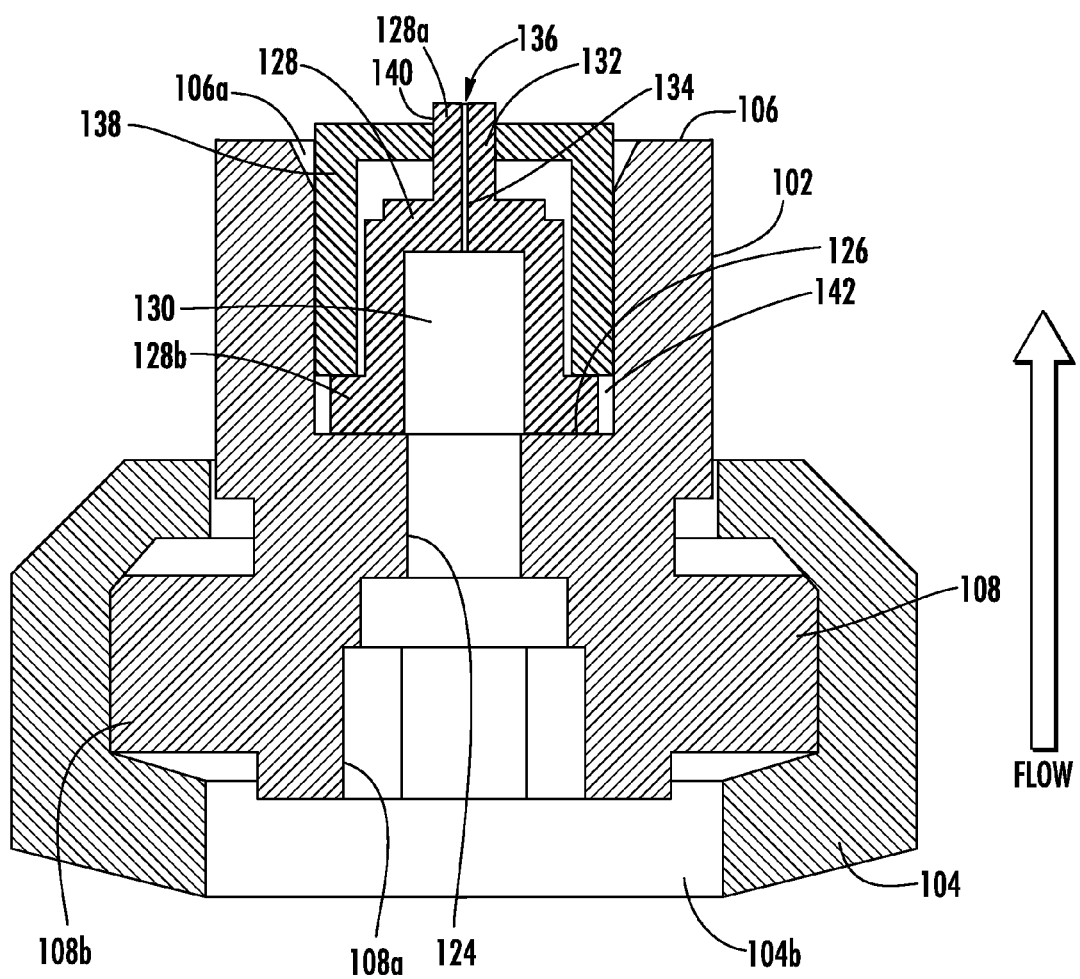
FIG. 5B is a sectional view of the embodiment of a one-way valve shown in FIG. 5A.

In a third embodiment, as shown in FIGS. 5A and 5B, a valve body 102 defines an annular seat 126 formed at the intersection of an intermediate opening 124 and a first bore 106a formed at a valve body first end 106. In preferred embodiments, valve body 102 may be formed from a polymer, aluminum, stainless steel, etc. A duckbill valve 128, having a first end 128a and a second end 128b, is received within valve body first bore 106a such that duckbill valve second end 128b abuts with annular seat 126. A diameter of duckbill valve second end 128b is chosen to be smaller than a diameter of valve body first end bore 106a to prevent over compression of duckbill valve second end 128b when inserted into valve body 102. The void between duckbill valve second end 128b and the walls of valve body first end bore 106a is filled as described below.

Duckbill valve 128 includes a bore 130 formed in duckbill valve second end 128b that is in fluid communication with a valve body second bore 108a via intermediate opening 124. Duckbill valve 128 further includes an elongated neck 132 that extends from duckbill valve first end 128a to a position intermediate first and second ends 128a and 128b. Elongated neck 132 defines a passage 134 that is in fluid communication with duckbill valve second end bore 130 and an openable closure 136 positioned at duckbill valve first end 128a. Openable closure 136 is defined by walls of passage 134 at duckbill valve first end 128a.

In preferred embodiments, duckbill valve 128 may be formed from silicone rubber having a Shore A hardness of approximately 70±5. It should be understood that duckbill valve 128 may be formed from other suitable materials depending on the application of the valve. The material chosen to form duckbill valve 128 and the geometry of the valve itself together define the cracking pressure (the pressure necessary in duckbill valve second end bore 130 to cause passage 134 to open) of duckbill valve 128. However, the flexibility (hardness) of the material is the primary factor in defining the cracking pressure. Said another way, air pressure acting on the internal walls of duckbill valve second end bore 130 provides the force required to overcome the resistance of passage 134 to remain in its molded-closed condition. The resistance is a function of the hardness (stiffness) of the duckbill material and the geometry of passage 132 being molded in the closed condition. The cracking pressure in a preferred embodiment is approximately 1 psi.

A sleeve 138 having an opening 140 formed through a first end 138a is received in valve body first end bore 106a intermediate the walls of bore 106a and duckbill valve 128. Sleeve 138 is received over a portion of duckbill valve 128 such that a portion of elongated neck 132 is received through sleeve opening 140. A sleeve second end 138b is received adjacent to duckbill valve second end 128b and fills the void intermediate the walls of valve body first end bore 106a and duckbill second end 128b, which in turn assists in centering the duckbill valve in valve body first end bore 106a. In preferred embodiments, sleeve 138 may be made from polymers or metals such as aluminum, stainless steel, brass, etc. Sleeve 138 does not directly control the cracking pressure necessary to open passageway 134 but, instead, limits how wide passage 134 may open thereby regulating the size of passage opening 136.

The first embodiment operates by allowing air to flow in the direction of the flow arrow shown in FIG. 3, while preventing air flow in the opposite direction. In particular, when the pressure at first bore 106a is lower than that at second bore 108a, air enters second bore 108a, travels through second filter 112 into axial bore 122, travels into radial bore 118 and presses against sleeve 120. Sleeve 120 is designed to have a cracking pressure of 1.0 PSI, in an embodiment, at which the sleeve expands radially outward, thereby allowing the airflow to exit through the openings of the radial bore into the space below first filter 110. The airflow passes through first filter 110 and out through first bore 106a. If, in the alternative, the pressure at second bore 108a is lower than at first bore 106a, air flow is prevented from passing through radial bore 118 since sleeve 120 seals the openings of radial bore 118.

The second embodiment functions similar to that of the first embodiment in that air is allowed to flow in the direction of the flow arrow in FIGS. 3 and 4. However, instead of the air passing through an axial and radial bore, air passes through the porous material and is limited in flow rate based on the porosity of the material chosen. A sleeve 120 operates similar to the sleeve in the first embodiment in that once the air pressure acting on the inner surface of sleeve 120 exceeds a predetermined cracking pressure (in one preferred embodiment the cracking pressure is 1 psi), the air flow will radially expand sleeve 120, thereby allowing air to pass in the direction of the flow arrow. In one preferred embodiment, the air flow through insert end 114c provides a 9 psi increase over a one and one-half minute interval. Air is prevented from flowing in the opposite direction by sleeve 120.

The third embodiment functions similar to the first two embodiments and operates by allowing air to flow in the direction of the flow arrow while preventing air flow in the opposite direction. In particular, when the pressure at first bore 106a is lower than at second bore 108a, air enters second bore 108a, travels through intermediate opening 124 and bore 130 of duckbill valve 128 and through passage 134 of elongated neck 132 pressing against openable closure 136. In an embodiment, openable closure 136 may be designed to have a cracking pressure of 1.0 PSI, like those of sleeve 120 of the first and second embodiments. Once the pressure exceeds the cracking pressure, the walls of passage 134 will separate allowing openable closure 136 to create an opening that allows air to pass through in the direction of the arrow. Air is prevented from flowing in the opposite direction by openable closure 136.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What we claim:

1. A one-way check valve for use in a railway car control valve, said one-way check valve comprising:
   a. a body having
      i. a first end,
      ii. a second end,
      iii. a bore extending from said first end to said second end, and
   b. an insert formed of a first material, said insert having
      i. a first end,
      ii. a second end,
      iii. a middle portion therebetween, and
      iv. an axis extending from said first end to said second end; and
   c. a sleeve formed of a second material, said second material being different than said first material and said sleeve being operatively received on said insert intermediate said first end and said second end;
   wherein
      said insert is positioned in said body bore,
      when one of said insert and sleeve is in a first position, air flows in said body second end and out said body first end, and
      when said one of said insert and said sleeve is in a second position, air is prevented from flowing through said body in either direction.

2. The one-way check valve of claim 1, wherein said first material forming said insert is a polymer material.

3. The one-way check valve of claim 1, wherein a flexibility of said first material used to form said insert defines the insert's ability to move from said first position to said second position.

4. The one-way check valve of claim 1, further comprising a gasket on said body second end.

5. The one-way check valve of claim 1, wherein said sleeve is expandable and said second material forming said sleeve is a polymer material.

6. The one-way check valve of claim 1, wherein said sleeve is expandable and said second material forming said sleeve is an elastomer material.

7. The one-way check valve of claim 1, wherein said sleeve comprises an opening that receives said insert and wherein said opening regulates the amount of air flow out of said body first end.

8. A one-way check valve for use in a railway car control valve, said one-way check valve comprising:
   a. a body having
      i. a first end,
      ii. a second end,
      iii. a bore extending from said first end to said second end, and
   b. an elongated insert formed of a first material, said insert defining an outer surface, said insert configured to reduce the rate of air flow through said body; and
   c. a sleeve formed of a second material, said second material being different than said first material and said sleeve being received on said insert outer surface;
   wherein said insert is received in said body bore, and wherein one of said sleeve and said insert allows air to flow in a first direction from said body second end to said body first end and prevents air flow in an opposite second direction.

9. The one-way check valve of claim 8, wherein when air pressure at said body second end is greater than a predetermined air pressure, said one of said insert and said sleeve increases in diameter to allow air to flow in said first direction.

10. The one-way check valve of claim 8, wherein a flexibility of a said first material used to form said insert defines the insert's ability to allow air to flow in said first direction.

11. The one-way check valve of claim 8, wherein said second material forming said sleeve is one of an elastomer and polymer material.

12. The one-way check valve of claim 8, wherein said sleeve comprises an opening that receives said insert and wherein said opening regulates the amount of air flow in a first direction from said body second end to said body first end.

13. A railway car control valve comprising:
 a. a brake pipe port;
 b. an auxiliary reservoir port;
 c. a main piston intermediate said brake pipe port and said auxiliary reservoir port, said main piston configured to compare an air pressure supplied at said brake pipe port with an air pressure supplied at said auxiliary reservoir port; and
 d. a one-way check valve positioned intermediate said brake pipe port and said auxiliary reservoir port, said one-way check valve comprising:
  i. a body having a first end, a second end, and a bore extending from said first end to said second end,
  ii. an elongated insert formed of a first material, said insert defining an outer surface, said insert configured to reduce the rate of air flow through said body; and
  iii. a sleeve formed of a second material, said second material being different than said first material and said sleeve being received on said insert outer surface; wherein said insert is received in said body bore, and wherein one of said insert and said sleeve moves between a first position that allows air to flow in a first direction from said brake pipe port to said auxiliary reservoir and a second position that prevents air from flowing in a second direction from said auxiliary reservoir port to said brake pipe port.

14. The one-way check valve of claim 13, wherein when said air pressure at said brake pipe port is greater than a predetermined air pressure, said one of said insert and said sleeve increases in diameter from said second position to said first position to allow air to flow from said brake pipe port to said auxiliary reservoir port.

15. The one-way check valve of claim 13, wherein a flexibility of a said first material used to form said insert defines the insert's ability to move from said first position to said second position.

16. The one-way check valve of claim 13, wherein said sleeve comprises an opening that receives said insert and wherein said opening regulates the amount of air flow in a first direction from said brake pipe port to said auxiliary reservoir.

\* \* \* \* \*